United States Patent
Oetlinger

(10) Patent No.: US 6,722,811 B2
(45) Date of Patent: Apr. 20, 2004

(54) LOWER FRAME ASSEMBLY FOR BLANKING TOOL

(75) Inventor: Frank E. Oetlinger, Grafton, WI (US)

(73) Assignee: Blanking Systems, Inc., Grafton, WI (US)

( * ) Notice: Subject to any disclaimer, the term of this patent is extended or adjusted under 35 U.S.C. 154(b) by 6 days.

(21) Appl. No.: 10/079,370

(22) Filed: Feb. 20, 2002

(65) Prior Publication Data
US 2003/0154838 A1 Aug. 21, 2003

(51) Int. Cl.[7] .................................................. F16S 3/04
(52) U.S. Cl. ................. 403/374.3; 403/110; 83/699.31; 83/859; 493/76
(58) Field of Search .................... 83/103, 859, 701, 83/699.31, 698.41, 698.51, 698.61, 468.1, 468.2, 468.7; 225/97; 493/73, 76; 403/393, 110, 374.3, 402

(56) References Cited

U.S. PATENT DOCUMENTS

| 4,017,199 | A |   | 4/1977 | Strassle |
| 5,337,641 | A | * | 8/1994 | Duginske ............... 83/468.2 X |
| 5,443,554 | A | * | 8/1995 | Robert .................. 83/468.7 |
| 5,671,580 | A | * | 9/1997 | Chou ................... 403/402 |
| 5,768,966 | A | * | 6/1998 | Duginske ............... 83/468.7 |
| 5,845,555 | A | * | 12/1998 | Dawley ................ 83/468.7 X |
| 5,918,392 | A | * | 7/1999 | Bates .................. 403/402 X |

FOREIGN PATENT DOCUMENTS

| CA | 2 287 035 | 4/2001 |
| CH | 629 885 | 3/1982 |
| DE | 196 41 500 | 4/1998 |
| GB | 1 256 226 | 12/1971 |

* cited by examiner

Primary Examiner—Charles Goodman
(74) Attorney, Agent, or Firm—Boyle Fredrickson Newholm Stein & Gratz S.C.

(57) ABSTRACT

A frame assembly for a lower blanking tool of a carton die cutting machine. The frame assembly includes an outer frame comprised of a pair of opposite longitudinally extending side rails and a pair of opposite cross rails extending crosswise between the side rails. Each of the cross rails has a T-shaped slot formed therein opening to its inner surface, and each of the side rails have a T-shaped slot formed therein opening to its upper surface. Each slot extends downwardly at an acute angle with respect to a horizontal plane. A plurality of corner pieces rigidly interconnect the rails together with fasteners extending into the T-shaped slots of adjacent side and cross rails so that when tightened, the corner pieces function like clamps to rigidly interconnect the rails together.

15 Claims, 5 Drawing Sheets

LOWER FRAME ASSEMBLY FOR BLANKING TOOL

BACKGROUND OF THE INVENTION

The present invention relates to die cutting machines for making carton blanks, and more particularly to a frame assembly for a lower blanking tool that supports carton scrap during a blanking operation in a die cutting machine.

In the manufacture of cartons, small sheets of paper material having specific profiles are cut out of larger sheets of paper material. These smaller sheets are known as carton blanks which, in turn, are formed into cartons and/or boxes. The blanks are formed during a process known as a blanking operation in a die cutting machine.

In a die cutting machine, the blanks are cut, but not removed from a large sheet of paper material. After the blanks have been cut, the sheet is moved downstream in the die cutting machine to a blanking station where the sheet is positioned over a frame assembly for support. The frame assembly includes an outer frame and an inner grid having large openings which correspond in size, in shape and in position to the profile of the carton blank previously cut. Below the frame is a mechanism for stacking the carton blanks.

At the blanking station, an upper tool is used in combination with the lower tool or frame assembly to knock the carton blanks from the sheet of paper material while holding the scrap material that surrounds the blanks. The upper tool has a support board that moves vertically up and down in the die cutting machine, and the support board typically has a plurality of stand-offs depending therefrom that hold pushers spaced beneath the board which in turn are used to push the carton blanks from the sheet through the lower tool or frame assembly. A plurality of presser assemblies are also mounted in the support board and depend therefrom to hold the scrap material against the lower tool or frame assembly during the blanking operation so that the blanks may be pushed from the sheet. A presser assembly typically includes a presser rail which is biased downwardly away from the support board by a spring so that the rail is positioned slightly below the pushers. As the upper tool is lowered, the presser rail engages the sheet of paper material first such that a scrap portion of the large sheet of material is secured between the presser rail and the frame. The upper tool then continues to be lowered such that the sheet of material engages the inner grid within the frame while at substantially the same time the pushers engage the carton blanks and knock the blanks out of the sheet of material and through the inner grid. The carton blanks then fall into a stacking mechanism below the frame where the blanks are stacked for further processing.

The lower tool used in the blanking operation is typically comprised of a steel outer frame that supports an inner grid. Steel was used because of its inherent strength and stiffness, but steel also significantly increases the weight and cost of the lower tool. In the past, it was thought that materials such as aluminum, although lighter and easier to process than steel, could not be used for the lower blanking tool because aluminum would not have sufficient strength or stiffness and would be too flexible to withstand the constant abuse taking place during a blanking operation.

The frame and grid support a sheet of paper material during the blanking operation, and thus the grid must be configured to match or conform to the die cut in the sheet of paper material. In addition, the grid must be reconfigured whenever a different carton blank needs to be produced. Unfortunately, due to manufacturing tolerances and the like, outer frames are not always "square" and rigid. In addition, the grid may not always be positioned with high precision within the outer frame since the attachment pieces which hold the grid onto the frame can move slightly during assembly and thus alter the desired position of the grid.

SUMMARY OF THE INVENTION

It is an object of the present invention to provide an improved frame assembly for a lower blanking tool of a carton die cutting machine.

It is another object of the present invention to provide a frame assembly for a lower blanking tool that is composed of aluminum, but yet which is durable and rigid during a blanking operation.

Yet another object of the invention is to provide a frame assembly for a lower blanking tool which is easy to assemble, compatible with standard blanking operation machinery, and relatively inexpensive.

In order to accomplish the above objects, the present invention provides a frame assembly for a lower blanking tool of a carton die cutting machine. The frame assembly includes an outer frame for supporting a sheet of die cut paper material during a blanking operation wherein the sheet of paper material defines a substantially horizontal plane. The outer frame includes a pair of opposite, spaced apart longitudinally extending side rails, and a pair of opposite, spaced apart cross rails extending crosswise between the side rails. The side rails and cross rails are all preferably composed of extruded aluminum. Each of the cross rails have an inner surface disposed substantially transverse to the plane defined by the sheet of paper material and have a T-shaped slot formed therein opening to the inner surface. Each of the side rails have an upper surface disposed substantially parallel to the plane defined by the sheet of paper material and have a T-shaped slot formed therein opening to the upper surface. Each of the T-shaped slots define a downwardly extending axis disposed at an acute angle with respect to the plane defined by the sheet of paper material. Finally, the frame assembly includes a plurality of corner pieces which rigidly interconnect the rails together. Each of the corner pieces includes fasteners extending into the T-shaped slots of adjacent side and cross rails. The downward extending axis of each T-shaped slot together with the design of the corner pieces compensates for any geometric or extrusion tolerances in the side and cross rails so that high precision may be maintained to insure that the frame remains square.

In other aspect, the invention includes a frame member for a lower blanking tool frame assembly of a die cutting machine. The frame member comprises an elongate rail having an upper surface, a lower surface, an outer surface and an inner surface. The rail has a bolt receiving T-shaped slot formed therein which opens to the inner surface of the elongate rail and defines a downwardly extending axis disposed at an acute angle with respect to the inner surface of the rail.

In yet another aspect, the invention includes a corner piece for interconnecting the frame members or rails of the lower blanking tool frame assembly used in a carton die cutting machine. Each corner piece includes an L-shaped body having a horizontal plate member defining a substantially flat upper face, a substantially flat opposite lower face, an inside face, an opposite outside face, and an end face. The L-shaped body also includes an upright plate member defining a substantially flat inner face contiguous with the upper face of the horizontal plate member, a substantially flat outer face contiguous with the lower face of the horizontal plate member, an inside face contiguous with the inside face of the horizontal plate member, an opposite outside face contiguous with the outside face of the horizontal plate member and a top face. The horizontal plate member has at least one outwardly extending bolt receiving bore formed therethrough which defines an axis disposed at an acute angle with respect to the upper and lower faces of the horizontal plate member. The upright plate member has at least one downwardly extending bolt receiving bore extending therethrough which defines an axis disposed at an acute angle with respect to the inner and outer faces of the upright plate member. The corner piece also includes a lip projecting outwardly from the outer face of the upright plate member and a tenon projecting downwardly from the lower face of the horizontal plate member. The primary advantage of the corner piece of the present invention is that as fasteners extending therethrough into the T-shaped slots of the rails of the frame assembly are tightened, the corner pieces properly locate the side rails and cross rails and at the same time pull the side rails and cross rails into a "square" or 90° relationship. The corner pieces also rigidly interconnect the side and cross rails together so that a frame assembly of high precision can be utilized in the blanking operation of a carton die cutting machine.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENTS

Figure 1:
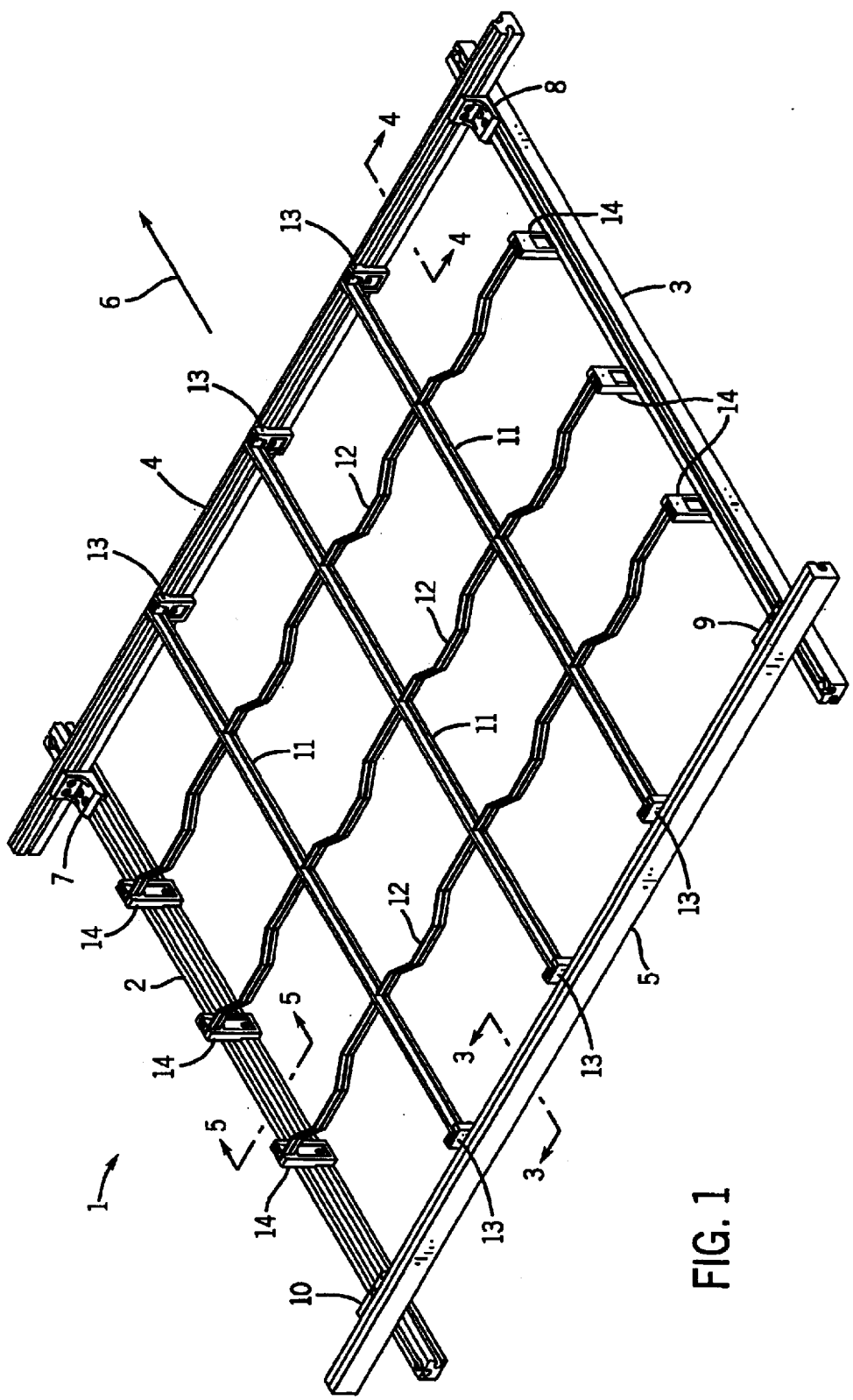
FIG. 1 is a perspective view of a lower frame assembly for a blanking tool of a carton die cutting machine constructed in accordance with the principles of the present invention.

Referring now to the drawings, FIG. 1 illustrates a lower frame assembly generally designated by the numeral 1 which is used in a blanking tool of a die cutting machine for converting or processing a sheet of paper material into a carton blank. These machines are well known in the art and are used to cut one or several blanks into each sheet of paper material which, after folding and gluing, may be formed into cartons or boxes. As is conventional, the sheets of paper material move in a substantially horizontal plane within the machine and are carried through various sequences of printing, cutting, embossing, creasing, waste stripping and/or blanking stations.

The die cutting machine usually is formed by a series of stations with the first station being a starting position or input station in which the sheets, which may be preprinted if desired, are taken one by one from the top of a stack to a feed table where they are placed in position against frontal and side guides. The sheet can then be grasped by a gripper bar and lead downstream or in the machine direction into subsequent processing stations. Typically, the sheet is first conveyed into a cutting station where the carton or box blanks of a desired size and profile are die cut into the sheet. These blanks are held to the sheet by knicks which are arranged along the cut edges of the blanks. This cutting station is usually comprised of upper and lower tools, one of which is provided with a plurality of line-shaped straight and curved die cutting blades. If desired, the cutting station may be proceeded by a printing station, or as noted above, the sheets may be preprinted. After cutting, the sheet is then lead to a stripping station where the waste, i.e. the unused scrap between the various blanks, are grasped by upper and lower pins in order to be lead downward into a waste container. The sheet is then fed to a blanking station where the sheet is positioned horizontally over a lower frame for support. The lower frame includes an inner grid having large openings which correspond in size, in shape and in position to the profile of the blank previously cut. An upper blanking tool having one or more presser assemblies mounted thereto then moves vertically downwardly in the die cutting machine to secure the scrap portions against the grid and frame and then as the tool continues to move downwardly, the fasten points or knicks between the blanks and the sheet are broken by pushers so that each of the blanks are released, pushed through the grid and falls below the frame where the blanks are stacked for further processing. Finally, the residual or remaining portion of the sheet is carried into a delivery or exit station where it is released by the gripper bar as waste material.

Referring now to FIG. 1, there is illustrated frame assembly 1 for a lower blanking tool of a carton die cutting machine. The lower frame assembly 1 includes an outer frame comprised of a pair of opposite, spaced apart longitudinally extending side frame members or side rails 2 and 3, and a pair of opposite, spaced apart cross frame members or cross rails 4 and 5 extending crosswise between side rails 2 and 3. Arrow 6 illustrates the machine direction, i.e. the direction of movement of a sheet of paper material (not shown) within the die cutting machine. Thus, as illustrated in FIG. 1, side rail 2 would be considered the left side rail while side rail 3 would be considered the right side rail. Likewise, cross rail 4 would be considered the front or leading cross rail while cross rail 5 would be considered the rear or trailing cross rail. As illustrated, cross rails 4 and 5 each have a length such that their opposite ends overlap the opposite ends of side rails 2 and 3. Also, cross rails 4 and 5 are disposed on top of side rails 2 and 3 so that the lower surface of cross rails 4 and 5 abut against the upper surfaces of side rails 2 and 3, as will hereinafter be described.

Side rails 2 and 3 are rigidly interconnected to cross rails 4 and 5 by means of a plurality of corner pieces 7–10. Corner pieces 7 and 9 are referred to herein as right corner pieces while corner pieces 8 and 10 are referred to herein as left corner pieces. The terms "right" and "left" refer to the location of a tenon on the underside of each corner piece (see FIG. 7 versus FIG. 11), but it should be noted that left corner pieces 8 and 10 are essentially mirror images of right corner pieces 7 and 9. Corner pieces 7–10 are used to rigidly interconnect rails 2–5 to one another, and function like clamps to tightly hold rails 2–5 together in a "square" or 90° relationship, as will hereinafter be described.

The inner grid is composed of a plurality of parallel lengthwise bars 11 extending in the machine direction between front rail 4 and rear rail 5, and a plurality of substantially parallel crosswise bars 12 extending transversely to the machine direction 6 between left rail 2 and right rail 3. Bars 11 and 12 of the inner grid can be point welded or glued with adhesive at the points where they intersect to insure rigidity of the inner grid. Bars 11 are attached to cross rails 4 and 5 by means of a plurality of attachment pieces 13. Likewise, bars 12 are attached to side rails 2 and 3 by a plurality of attachment pieces 14. It should be noted that the present invention is not limited to the design for the inner grid illustrated in FIG. 1 as the design illustrated is but one example of an inner grid design. In fact, the profile of the inner grid is typically changed depending upon the type, size and shape of the carton blank to be produced. Thus, the inner grid illustrated in FIG. 1 is for illustration purposes only.

Figure 2:
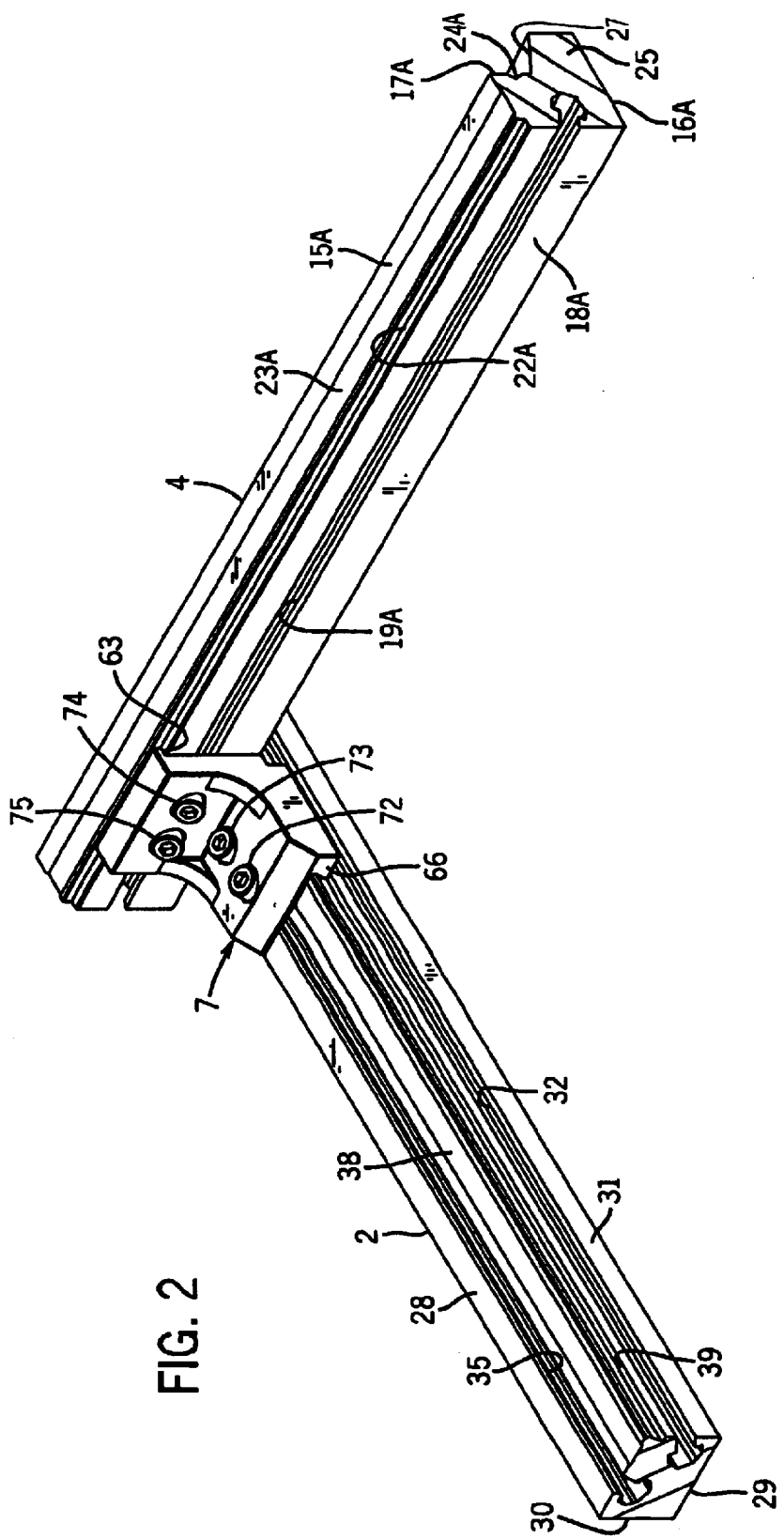
FIG. 2 is an enlarged perspective view, partially in section, illustrating a corner piece rigidly interconnecting a side rail and cross rail of the frame assembly.
Figure 3:
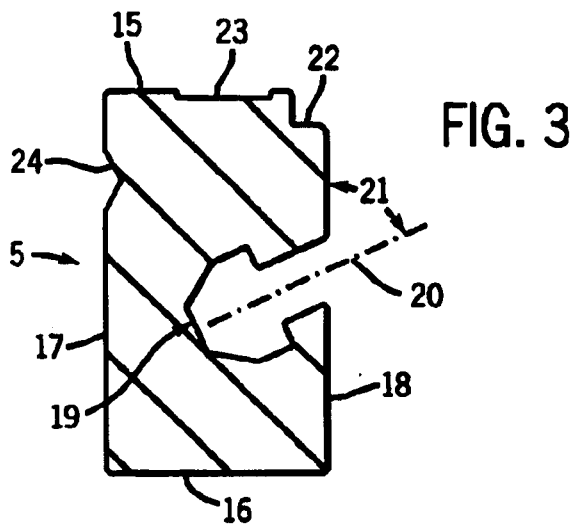
FIG. 3 is a sectional view taken along the plane of the line 3—3 in FIG. 1 of the rear cross rail for the lower frame assembly.

Referring now to FIG. 2, there is illustrated in more detail the interconnection of left side rail 2 to front cross rail 4 by corner piece 7. Before describing the clamping of side rail 2 to cross rail 4, reference is made to FIG. 3 wherein the cross sectional profile of rear cross rail 5 is illustrated. More specifically, cross rail 5 includes an upper surface 15, an opposite lower surface 16, an outer surface 17, and an opposite inner surface 18. Each surface 15–18 is substantially planar, and surface 18 is referred to as the "inner" surface since it faces the interior of frame assembly 1, i.e. towards the inner grid. As shown best in FIG. 3, rail 5 includes a bolt receiving T-shaped slot 19 formed therein. Slot 19 is formed throughout the entire elongate length of rail 5 and as shown best in FIG. 1, opens to both of the opposite ends of rail 5. Slot 19 has a blind end located within the interior of rail 5 and has an open end which opens to inner surface 18. Slot 19 defines a downwardly extending axis 20 disposed at an acute angle 21 with respect to the plane of inner surface 18. As shown in FIG. 3, acute angle 21 is defined as the angle between axis 20 and the plane of inner surface 18. Acute angle 21 may be an angle between 1° and 89°, but is preferably an angle of about 30° to about 80°, and most preferably an angle of about 65°.

As shown in FIG. 3, rail 5 also includes an inwardly projecting ledge 22 formed in inner surface 18. Ledge 22 is planar in shape and is disposed at an angle of 90° with respect to inner surface 18. However, ledge 22 could also be modified to be at an acute angle with respect to inner surface 18 if desired. As shown, ledge 22 is located at the intersection of the upper surface 15 and inner surface 18 of rail 5 such that ledge 22 is located between upper surface 15 and T-shaped slot 19. As shown best in FIG. 1, ledge 22 extends along the entire length of rail 5 and opens to both of the opposite ends of rail 5 in a manner similar to slot 19.

Rail 5 further includes a channel-shaped recess 23 formed in upper surface 15.

Again, as shown best in FIG. 1, recess 23 is formed and extends along the entire length of rail 5 and opens to both of the opposite ends of rail 5. Recess 23 is typically utilized to receive a ruler or other measuring device which aids in the proper placement of attachment members 13 and 14 when building the inner grid.

Rail 5 also includes a V-shaped cavity 24 formed in its outer surface 17. Again, as with slot 19, ledge 22 and recess 23, cavity 24 is formed along the entire length of rail 5 and opens to both of the opposite ends of rail 5, as shown best in FIG. 1. Typically, each face of cavity 24 is formed at a 60° angle to a horizontal line running through the center thereof. The function of cavity 24 is to locate a linear scale for measuring placement of the bars 11, 12 for the inner grid.

Figure 4:
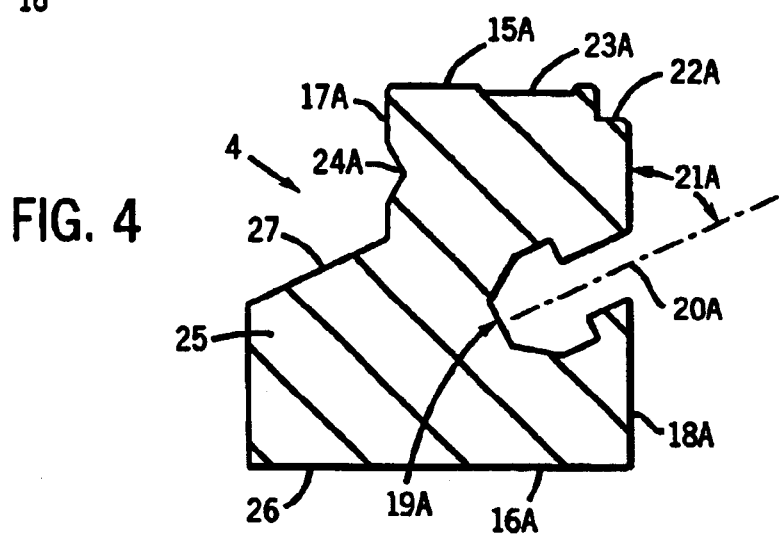
FIG. 4 is a sectional view taken along the plane of the line 4—4 in FIG. 1 of the front cross rail for the lower frame assembly.

Turning now to FIG. 4, there is illustrated the cross sectional profile of front cross rail 4. Front cross rail 4 is identical to cross rail 5 with the exception that rail 4 includes a reinforcement or stiffening member 25. As noted, rail 4 is identical to rail 5 with the exception of reinforcement member 25 so that like numbers, except utilizing the designation "A" therewith, are utilized to refer to like parts or elements. Thus, as illustrated in FIG. 4, reinforcement member 25 projects outwardly from outer surface 17A and is formed along the entire length of rail 4. Although illustrated as being integral with rail 4, reinforcement member 25 could also be a separate piece which could be removably attached with fasteners if desired. Also, although illustrated as having a lower surface 26 contiguous with lower surface 16A of rail 4 and a chamfered surface 27 contiguous with outer surface 17A, reinforcement member 25 could take other shapes and be positioned in a slightly different location than illustrated so long as it functions to stiffen front cross rail 4.

As illustrated, cross rails 4 and 5 are elongated members having opposite ends and a length greater than either its height or its width. Rail 5 and rail 4 (without reinforcement member 25) have a height greater than their width, and are formed of aluminum, preferably extruded aluminum. Extrusion techniques provide the most efficient and cost effect method of producing an aluminum rail having the profile illustrated in FIGS. 3–5.

Figure 5:
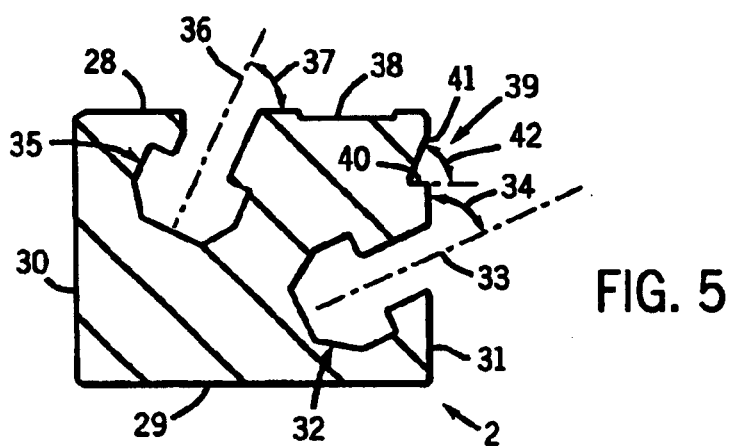
FIG. 5 is a sectional view taken along the plane of the line 5—5 in FIG. 1 of a side rail for the lower frame assembly.

Referring now to FIG. 5, there is illustrated the cross sectional profile of side rails 2 and 3. The profiles of rails 2 and 3 are identical, and therefore only one will be described, i.e. side rail 2. As illustrated, side rail 2 is an elongate member having a length greater than either its height or its width. However, rail 2 has a width which is slightly greater than its height which enables it to accommodate the additional slot to hereinafter be described. Again, as with rails 4 and 5, rails 2 and 3 are composed of aluminum, preferably extruded aluminum. As illustrated, rail 2 has an upper surface 28, an opposite lower surface 29, an outer surface 30 and an opposite inner surface 31. Surfaces 28–31 are substantially planar in shape and are formed along the entire length of rail 2 and extend completely between opposite ends of rail 2. As shown best in FIG. 5, rail 2 includes a bolt receiving T-shaped slot 32 formed therein throughout the entire length thereof. Slot 32 defines a downwardly extending axis 33 disposed at an acute angle 34 with respect to the plane defined by inner surface 31. Acute angle 34 may be any angle between 1° and 89°, but is preferably between about 30° to about 80° and is most preferably about 65°. Slot 32 has a blind end located within rail 2 and has an open end which opens to inner surface 31. As shown best in FIG. 1, slot 32 is formed along the entire length of rail 2 and is open to both of the opposite ends of rail 2.

As shown in FIG. 5, rail 2 further includes a second bolt receiving T-shaped slot 35 formed therein. Slot 35 is identical to slot 32 in shape and also defines a downwardly extending axis 36 disposed at an acute angle 37 with respect to upper surface 28. As with angle 34, acute angle 37 may be any angle between about 1° to about 89°, but is preferably between about 30° to about 80° and most preferably about 65°. Slot 35 is formed along the entire length of rail 2 and opens to both of the opposite ends of rail 2. As illustrated, slot 35 has a blind end located within rail 2 and an open end which opens to upper surface 28. The blind end of slot 35 (as well as the blind end of slots 19, 19A and 32) is configured to conform to the shape of a nut (not shown) captured therein. The nut is utilized to threadedly receive and hold the shank of a bolt extending into slot 35 (as well as slots 19, 19A and 32), as will hereinafter be described.

As illustrated, rail 2 also includes a channel-shaped recess 38 formed in upper surface 28. Recess 38 is formed in upper surface 28 between slot 35 and inner surface 31, and functions to receive a ruler or other measuring device to aid in building the inner grid in a manner similar to recess 23 and 23A in rails 4 and 5. Recess 38 is formed throughout the entire length of rail 2 and opens to both of the opposite ends thereof.

As shown best in FIG. 5, rail 2 also includes an angled groove 39 formed in inner surface 31 above slot 32. Again, groove 39 is formed through the entire length of rail 2 and opens to both of the opposite ends thereof. As illustrated, groove 39 includes an inwardly projecting ledge 40, and an angled surface 41. Ledge 40 has a planar surface and is disposed at an angle of about 90° with respect to inner surface 31. Other acute angles for ledge 40 may be used, but 90° is preferred. As shown in FIG. 4, angled surface 41 forms an acute angle 42 with ledge 40. Angle 42 is generally between about 30° to about 80°, but is preferably about 70°. Groove 39 functions to receive a tenon of corner piece 7 as will hereinafter be described.

Referring now to FIGS. 6–9, right corner piece 7 is illustrated in more detail. As noted earlier, corner piece 7 is identical to corner piece 9 (FIGS. 6–9) while corner pieces 8 and 10 are mirror images thereof (see FIGS. 10 and 11). More specifically, corner piece 7 interconnects side rail 2 and front cross rail 4 of the lower blanking tool frame assembly, and includes an L-shaped body having a horizontal plate member 43 and an upright or vertical plate member 44. Horizontal plate member 43 defines a substantially flat upper face 45, a substantially flat opposite lower face 46, an inside face 47, an opposite outside face 48 and an end face 49. As illustrated, each of faces 45–49 are substantially planar in shape. Upright or vertical plate member 44 also defines a substantially flat inner face 50 contiguous with upper face 45, a substantially flat outer face 51 contiguous with lower face 46, an inside face 52 contiguous with the inside face 47 of horizontal plate member 43, an opposite outside face 53 contiguous with the outside face 48 of horizontal plate member 43, and a top face 54. As illustrated, each face 50–54 is substantially planar in shape. As illustrated best in FIGS. 6 and 7, horizontal plate member 43 has a pair of adjacent, aligned outwardly extending bolt receiving bores 55 and 56 formed therethrough extending between upper face 45 and lower face 46. Each bore 55, 56 is identical and defines an axis 57 disposed at an acute angle 58 with respect to the upper face 45 and lower face 46. Acute angle 58 may be between about 1° and 89°, but preferably between about 30° and about 80°, and most preferably about 65°.

Figure 6:
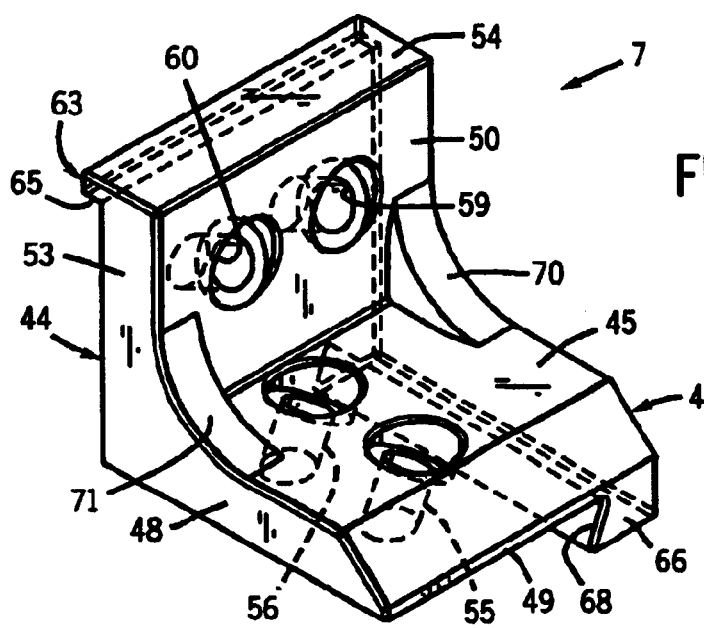
FIG. 6 is a perspective view of a right corner piece used to rigidly interconnect a side rail to a cross rail of the frame assembly.
Figure 8:
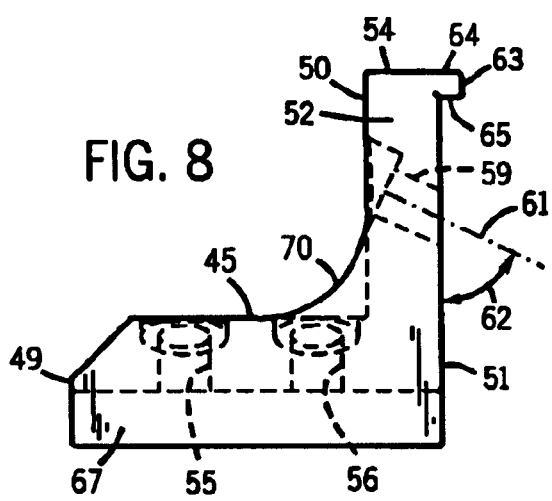
FIG. 8 is a side view of the corner piece of FIG. 6.

As illustrated best in FIGS. 6 and 8, the upright or vertical plate member 44 also includes a pair of adjacent, aligned outwardly extending bolt receiving bores 59 and 60 formed therethrough from inner face 50 to outer face 51. Each bore 59, 60 defines an axis 61 disposed at an acute angle 62 with respect to inner face 50 and outer face 51. Again, acute angle 62 may be anywhere between 1° and 89°, but is preferably between about 30° and about 80°, and is most preferably about 65°.

Figure 9:
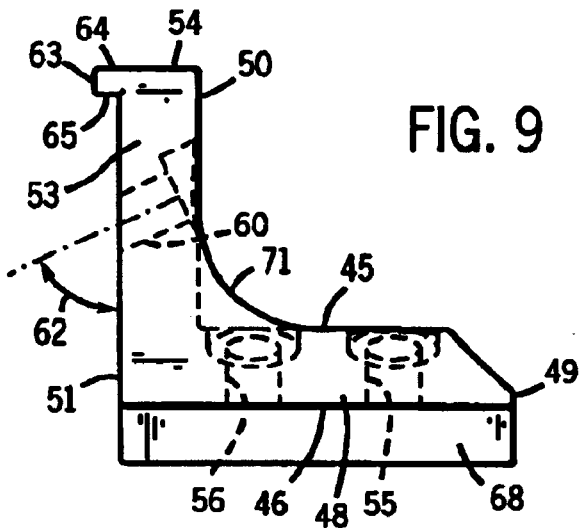
FIG. 9 is an opposite side view of the corner piece of FIG. 6.

As seen best in FIGS. 6, 8 and 9, upright plate member 44 has a lip 63 projecting outwardly from outer face 51. Lip 63 has an upper surface 64 and a lower surface 65. Upper surface 64 is contiguous with the top face 54 while lower surface 65 is contiguous with outer face 51. Lower surface 65 is disposed substantially 90° with respect to outer face 51, and lip 63 extends completely across the outer face 51 of plate member 44 from the inside face 52 to the outside face 53. Although illustrated as being contiguous with top face 54, upper surface 64 and lip 63 could also be spaced slightly downwardly therefrom if desired. Also, lip 63 need not necessarily extend completely across outer face 51, but preferably does so to provide the maximum amount of clamp force against ledge 22, as will hereinafter be described.

Figure 7:
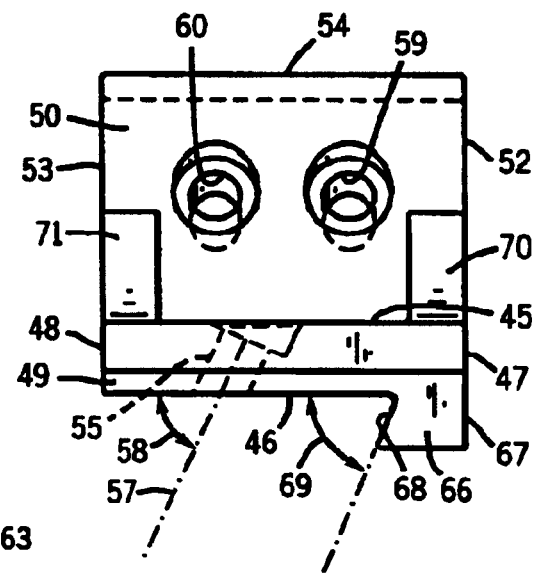
FIG. 7 is a front view of the corner piece of FIG. 6.

As best shown in FIGS. 6 and 7, corner piece 7 also includes a tenon 66 projecting downwardly from the lower face 46 of horizontal plate member 43. Tenon 66 has an inside surface 67 which is contiguous with the inside face 47 of horizontal plate member 43, and an outside surface 68 which is contiguous with lower face 46 of horizontal plate member 43. As shown best in FIG. 7, outside surface 68 is disposed at an acute angle 69 with respect to lower face 46. Acute angle 69 may be any angle between 1° and 89°, but preferably matches the angle 42 formed by surface 41 of groove 39 in side rail 2. Again, by matching angle 69 with angle 42, the maximum amount of friction is provided between surfaces 67 and 41 to provide the maximum clamping force, as will hereinafter be described. Tenon 66 extends completely along the lower face 46 of horizontal plate member 43 from end face 49 to the outer face 51 of upright plate member 44, as shown best in FIGS. 6, 8 and 9. Finally, corner piece 7 includes a pair of reinforcement members or blocks 70 and 71 located at the intersection of inside face 52 of upright plate member 44 and upper face 45 of horizontal plate member 43. As shown best in FIG. 5, each block 70, 71 extends between the upper face 45 and the inner face 50, and preferably comprises a wedge-shaped or triangular-shaped member. Although blocks 70, 71 could be located anywhere along the intersection of upper face 45 with inner face 50, block 70 is preferably located adjacent inside faces 47 and 52 while block 71 is preferably located adjacent outside faces 48 and 53 to provide maximum support or reinforcement for corner piece 7.

Figure 10:
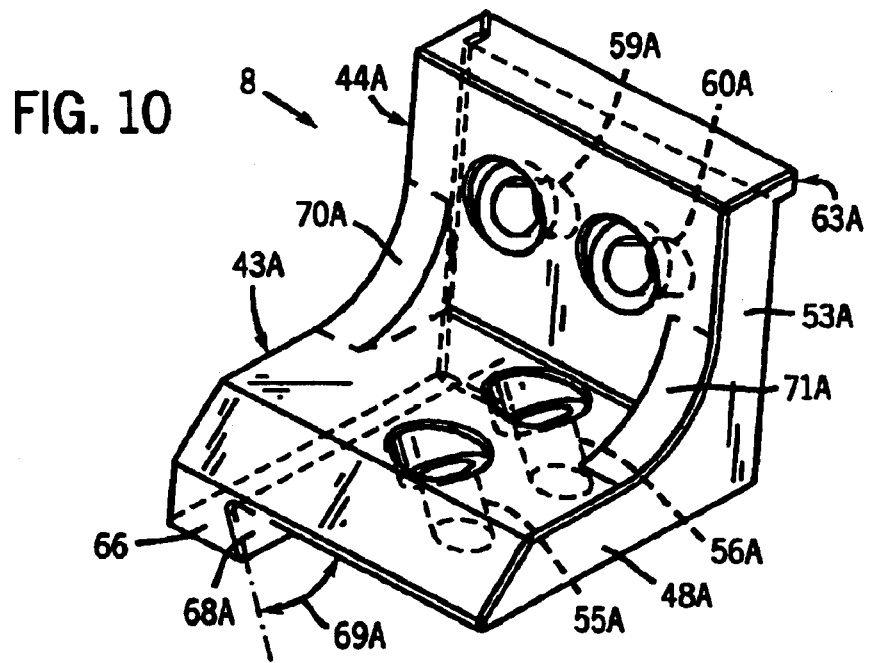
FIG. 10 is a perspective view of a left corner piece used to rigidly interconnect a side rail to a cross rail of the frame assembly.

FIG. 10 illustrates left corner pieces 8 and 10. As left corner pieces 8 and 10 are mirror images of right corner pieces 7 and 9, they need not be described herein in detail, but identical parts utilize like numerals with the designation "A" therewith. Corner pieces 8 and 10 are referred to as "left" corner pieces since tenon 66A is located on the left side thereof. In like manner, corner pieces 7 and 9 are referred to as "right" corner pieces since tenon 66 is located along the right side thereof. In all other respects, corner pieces 8 and 10 are identical to corner pieces 7 and 9.

In order to assemble frame assembly 1, cross rails 4 and 5 are placed on top of side rails 2 and 3 so that the ends of rails 2–5 overlap one another, as illustrated in FIG. 1. Thereafter, right corner piece 7 is placed as illustrated in FIG. 2 with lip 63 engaging ledge 22A in cross rail 5, and outside surface 68 of tenon 66 engaging angled surface 41 of groove 39 formed in side rail 2. Fasteners 72 and 73 are then inserted through bores 55 and 56 into corresponding nuts contained in slot 35 of side rail 2. As fasteners 72 and 73 are tightened, they engage the nuts to pull or clamp cross rail 4 tightly against side rail 2. At the same time, fasteners 74 and 75 extend through bores 59 and 60 of upright plate member 44 into nuts captured within slot 19A of cross rail 5. As fasteners 74 and 75 are tightened, they pull or clamp the upper surface 29 of side rail 2 tightly against the lower surface 16A of cross rail 5. In this manner, rails 2 and 5 are rigidly interconnected. Thereafter, in a like manner, corner pieces 8–10 are utilized to rigidly interconnect the other three corners of frame assembly 1. As a result, rails 2–5 are rigidly interconnected to one another to form frame assembly 1.

As illustrated best in FIG. 1, the second T-shaped slot 32 formed in inner surface 41 of side rails 2 and 3, is utilized to connect a plurality of attachment pieces 14 for crosswise bars 12 of the inner grid. In like manner, the T-shaped slots 19 and 19A formed in cross rails 4 and 5, are also utilized to connect attachment pieces 13 for mounting lengthwise bars 11 of the inner grid.

I claim:

1. A corner piece for interconnecting frame members of a lower blanking tool frame assembly used in a carton die cutting machine, comprising:

an L-shaped body having a horizontal plate member defining a substantially flat upper face, a substantially flat opposite lower face, an inside face, an opposite outside face, and an end face, and an upright plate member defining a substantially flat inner face contiguous with said upper face, a substantially flat outer face contiguous with said lower face, an inside face contiguous with the inside face of said horizontal plate member, an opposite outside face contiguous with the outside face of said horizontal plate member, and a top face;

said horizontal plate member having at least one outwardly extending bolt-receiving bore formed therethrough, said outwardly extending bore defining an axis disposed at an acute angle with respect to said upper face;

said upright plate member having at least one downwardly extending bolt-receiving bore formed therethrough, said downwardly extending bore defining an axis disposed at an acute angle with respect to said inner face;

a lip projecting outwardly from the outer face of said upright plate member; and a tenon projecting downwardly from the lower face of said horizontal plate member.

2. The corner piece of claim 1 wherein said lip has an upper surface and a lower surface, and said upper surface is contiguous with the top face of said upright plate member.

3. The corner piece of claim 1 wherein said lip has an upper surface and a lower surface, and said lower surface is disposed substantially 90° with respect to the outer face of said upright plate member.

4. The corner piece of claim 1 wherein said lip extends completely across the outer face of said upright plate member from said inside to said outside faces.

5. The corner piece of claim 1 wherein said angles are between about 30° and about 80°.

6. The corner piece of claim 1 wherein said angles are 65°.

7. The corner piece of claim 1 wherein said horizontal plate member has two aligned outwardly extending bolt-receiving bores formed therethrough, each bore disposed at substantially identical acute angles with respect to said upper face.

8. The corner piece of claim 1 wherein said upright plate member has two aligned downwardly extending bolt-receiving bores formed therethrough, each bore disposed at substantially identical acute angles with respect to said inner face.

9. The corner piece of claim 1 wherein said tenon has an inside surface and an outside surface, and said inside surface is contiguous with the inside face of said horizontal plate member.

10. The corner piece of claim 1 wherein said tenon has an inside surface and an outside surface, and said outside surface is disposed at an acute angle with respect to said lower face.

11. The corner piece of claim 10 wherein the outside surface of said tenon is disposed at about 70° with respect to said lower face.

12. The corner piece of claim 1 wherein said tenon extends completely along the lower face of said horizontal plate member from said end face to the outer face of said upright plate member.

13. The corner piece of claim 1 further including at least one reinforcement member extending between the upper face of said horizontal plate member and the inner face of said upright plate member.

14. The corner piece of claim 13 wherein said reinforcement member comprises a wedge-shaped block.

15. The corner piece of claim 13 wherein said body includes two reinforcement members, one located adjacent said inside faces and the other located adjacent said outside faces.

* * * * *